United States Patent [19]
Allen

[11] Patent Number: 5,181,432
[45] Date of Patent: Jan. 26, 1993

[54] TIMING GEAR HAVING DIFFERENT KEYWAYS

[75] Inventor: Timothy R. Allen, Lavaca, Ark.

[73] Assignee: Cloyes Gear & Products, Willoughby, Ohio

[21] Appl. No.: 798,122

[22] Filed: Nov. 26, 1991

[51] Int. Cl.$^5$ .................. F16H 53/04; F16H 1/08; F16H 1/12

[52] U.S. Cl. .................. 74/395; 74/568 R; 116/200; 123/90.17; 123/90.31; 403/4; 403/356; 474/900; 474/903

[58] Field of Search ............ 74/395, 568 R; 116/200; 123/90.15, 90.17, 90.31; 403/4, 356; 474/900, 903

[56] References Cited

U.S. PATENT DOCUMENTS

| | | | |
|---|---|---|---|
| 3,237,469 | 3/1966 | Berry et al. | 474/900 X |
| 3,415,137 | 12/1968 | Casale | 74/395 |
| 3,501,973 | 3/1970 | Casale | 74/395 |
| 3,905,710 | 9/1975 | Cain et al. | 403/356 X |
| 4,096,836 | 6/1978 | Kopich | 74/395 X |

*Primary Examiner*—Allan D. Herrmann
*Attorney, Agent, or Firm*—Fay, Sharpe, Beall, Fagan, Minnich & McKee

[57] ABSTRACT

A timing gear device includes a first rotatably supported shaft, a first gear, having a predetermined number of circumferentially spaced teeth, engaged on and carried by the first shaft and a second rotatably supported shaft spaced from the first shaft. A second gear having a predetermined number of circumferentially spaced teeth is engaged on and carried by the second shaft. The first gear and the second gear are engaged with each other. A timing device is provided for changing the rotative position of the second shaft and the second gear in relation to the first shaft and the first gear. The timing device includes a single primary keyway in one of the second gear and the second shaft and a plurality of secondary keyways in another of the second gear and the second shaft. The secondary keyways have differing configurations. A key is provided in the primary keyway. The key is engaged in a predetermined one of the secondary keyways to establish a driving engagement between the second shaft and the second gear.

20 Claims, 3 Drawing Sheets

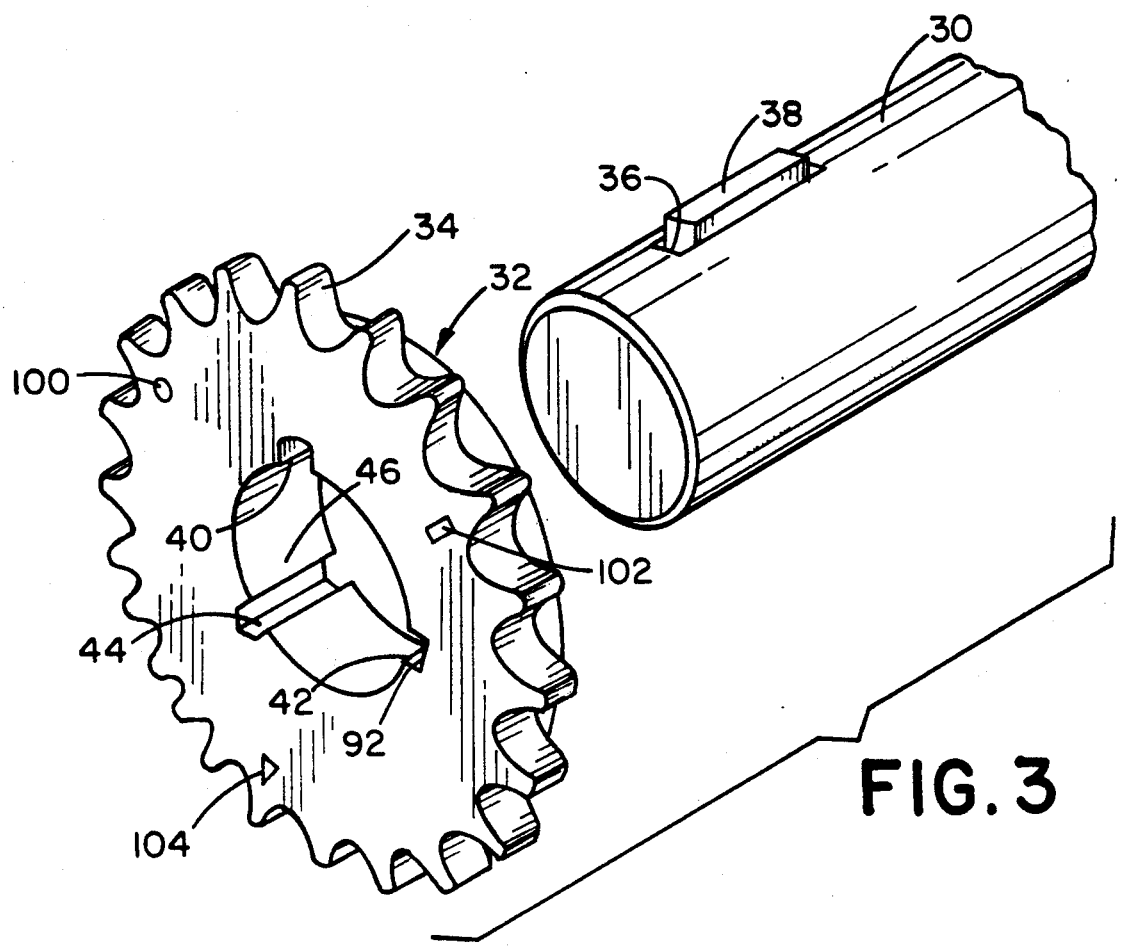
FIG. 3
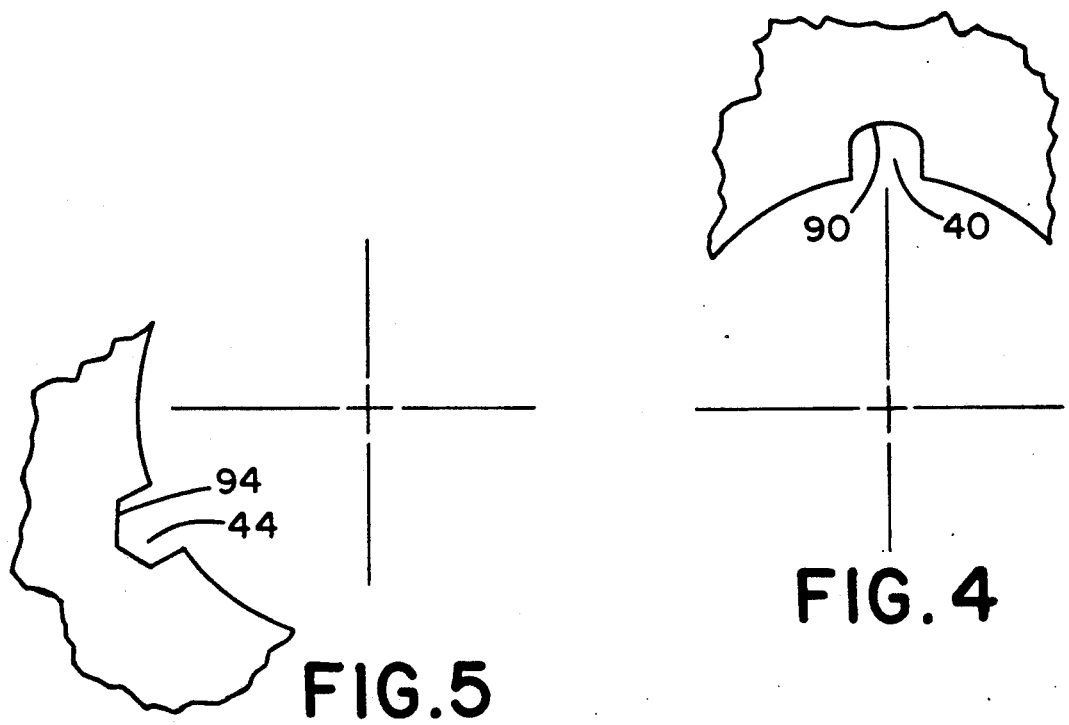
FIG. 5
FIG. 4

TIMING GEAR HAVING DIFFERENT KEYWAYS

BACKGROUND OF THE INVENTION

Internal combustion type engines employ a crankshaft to drive an apparatus to which the engine is connected, typically a vehicle of some sort, and a cam shaft to regulate the opening and closing of intake and exhaust port valves in the engine. Normally, sprocket and chain type timing means are employed in e.g. automobile engines to interconnect the crankshaft with the cam shaft although interengaging teeth are also used. The timing of the opening and closing of the intake and exhaust port valves relative to the position of the pistons of the engine is extremely critical. Adjustment of valve timing represented by, e.g., 1° or 2° of rotation of the crankshaft relative to the cam shaft can change the character of the engine.

It is desirable to advance or retard the timing of an engine in order to change the power vs. rpm range of the engine. For example, one would wish to advance the timing in order to shift the peak torque range of a particular engine to a lower rpm setting. This would be advantageous, e.g., for trucks, off-road vehicles and the like. In contrast, one would wish to retard the timing in order to shift the peak torque to a higher rpm setting. This may be advantageous for race cars, race motorcycles and the like. In general, it is desirable to have the ability to adjust the timing of engines for various types of vehicles such as trucks, passenger cars, off-road vehicles, motorcycles, snowmobiles, airplane engines, boat engines or even lawnmower engines.

Adjustment of the relative position of the crankshaft and the cam shaft in relation to each other is thus sometimes necessary. Such adjustment frequently requires that the shafts be adjusted circumferentially a distance equal to a fraction of the circumferential extent of one tooth of one of the gears or a distance equal to the circumferential extent of one or a multiplicity of teeth plus a fraction of the circumferential extent of one tooth. Where gears are subject to little force and abuse, they can be fixed to their shafts by lock bolts, set screws or the like so that any desired amount of turning and adjustment of the gears on their related shafts can be effected. However, in heavy duty use, such as in automobile engines and the like, the use of such fasteners is inadequate. Accordingly, keys and keyways are provided in this type of environment to provide accurate indexing of the gears and to provide a secure driving engagement between a gear and its shaft. However, with the use of keys and keyways, difficulty has been experienced in adjusting the timing for relative rotative position of the gear shafts other than a distance equal to the circumferential extent of one or a number of teeth of one of the gears. In such cases where the adjustment needs to be less than the circumferential extent of one tooth, a new keyway has to be cut into the gear in order to so adjust the gear in relation to its shaft.

In one known improvement on a gear having only a single secondary keyway and in which gear new keyways need to be cut on an as needed basis, a gear is known which has a plurality of circumferentially spaced secondary keyways such that a key of the associated shaft can be engaged in a selected one of the keyways in order to effect the desired rotative adjustment between the shaft and the gear. In this known type of gear, the secondary keyways are spaced circumferentially apart a distance equal to the circumferential extent of a predetermined number of teeth on the gear plus a predetermined incremental distance of adjustment effected by rotative movement of one gear a distance from one of the keyways to the next adjacent keyway and aligning to the mating gear by aligning the appropriately marked tooth.

However, one of the difficulties with this known gear is that indicia need to be provided on the face of the gear, typically by stamping, to distinguish one keyway from another. The stamping process adds a manufacturing step which, of course, increases production costs. In addition, by having to label the several keyways on the gear (as well as selected teeth) with symbols, the gear face will contain a sizeable number of symbols which may tend to confuse the mechanic due to the gear's cluttered appearance.

Accordingly, it has been considered desirable to develop a new and improved timing gear device which would overcome the foregoing difficulties and others while providing better and more advantageous overall results.

BRIEF SUMMARY OF THE INVENTION

In accordance with the present invention, a new and improved timing gear device is provided.

More particularly in accordance with this aspect of the invention, the timing device comprises a first rotatably supported shaft and a first gear, having a predetermined number of circumferentially spaced teeth engaged on and carried by the first shaft. A second rotatably supported shaft is spaced from the first shaft. A second gear, having a predetermined number of circumferentially spaced teeth is engaged on and is carried by the second shaft. A means for engaging the first gear and the second gear are provided. A timing means allows for the changing of the rotative position of the second shaft and the second gear in relation to the first shaft and the first gear. The timing means comprises a single primary keyway in one of the second gear and the second shaft and a plurality of secondary keyways in another of the second gear and the second shaft. The secondary keyways have differing configurations. A key in the primary keyway is engaged in a predetermined one of the secondary keyways to establish an accurate indexing of the gears and/or a driving engagement between the second shaft and the second gear.

According to another aspect of the invention, the secondary keyways are spaced apart a distance unequal to the circumferential extent of one or a plurality of teeth of the second gear.

According to still another aspect of the invention, the first and second gears are sprocket gears and the means for engaging the gears comprises a chain or a toothed belt which is looped around the first and second gears.

According to yet another aspect of the invention, the first and second gears are spur gears or helical gears and the means for engaging comprises intermeshing teeth of the first and second gears.

In accordance with another aspect of the invention, the differing configurations on the secondary keyways include a keyway having an arcuate closed end.

In accordance with still another aspect of the present invention, the differing configurations of the secondary keyways include a keyway having a wedge-shaped closed end.

One advantage of the present invention is the provision of a new and improved timing device that can be used in any instance where a timed relationship is required between rotating objects such as gears, cam wheels, trigger wheels and the like.

Another advantage of the present invention is the provision of a timing gear device which does not have the cluttered look of the known timing gear devices.

Still another advantage of the present invention is the provision of a timing gear device which is more easily handled by the mechanic since it is less likely to confuse the mechanic.

Yet another advantage of the present invention is the provision of a timing gear device which can be manufactured at lower cost.

A further advantage of the present invention is the provision of a timing gear device which has a plurality of secondary keyways that have differing configurations.

A still further advantage of the present invention is the provision of a timing gear device that can be adapted for use as a spur gear or a helical gear as well as for use as a sprocket gear.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts preferred and alternate embodiments of which will be described in detail in the specification and illustrated in the accompanying drawings which form a part hereof and wherein:

FIG. 3 is an enlarged exploded perspective view of a sprocket gear and its shaft as shown in FIG. 2;

FIG. 4 is a greatly enlarged front elevational view of a portion of the gear of FIG. 3;

FIG. 5 is a greatly enlarged front elevational view of another portion of the gear of FIG. 3; and, FIG. 6 is a front elevational view of a pair of interconnected gears according to an alternate embodiment of the present invention.

DETAILED DESCRIPTION OF THE PREFERRED AND ALTERNATE EMBODIMENTS

Figure 2:
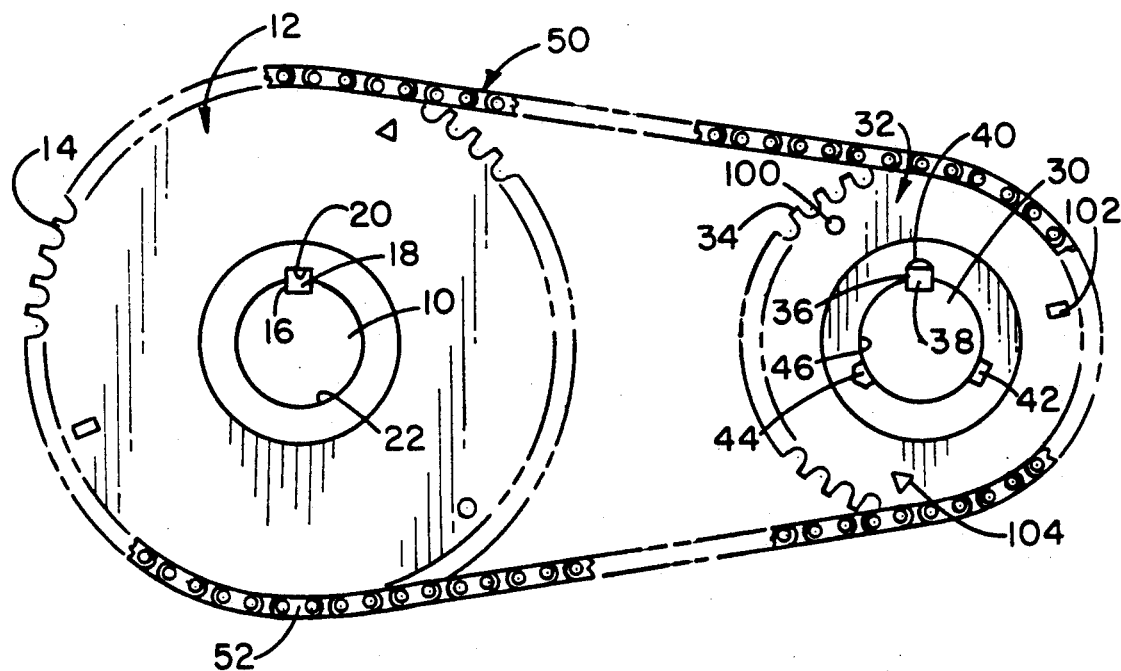
FIG. 2 is a side elevational view of a pair of connected sprocket gears according to the preferred embodiment of the present invention.
Figure 6:
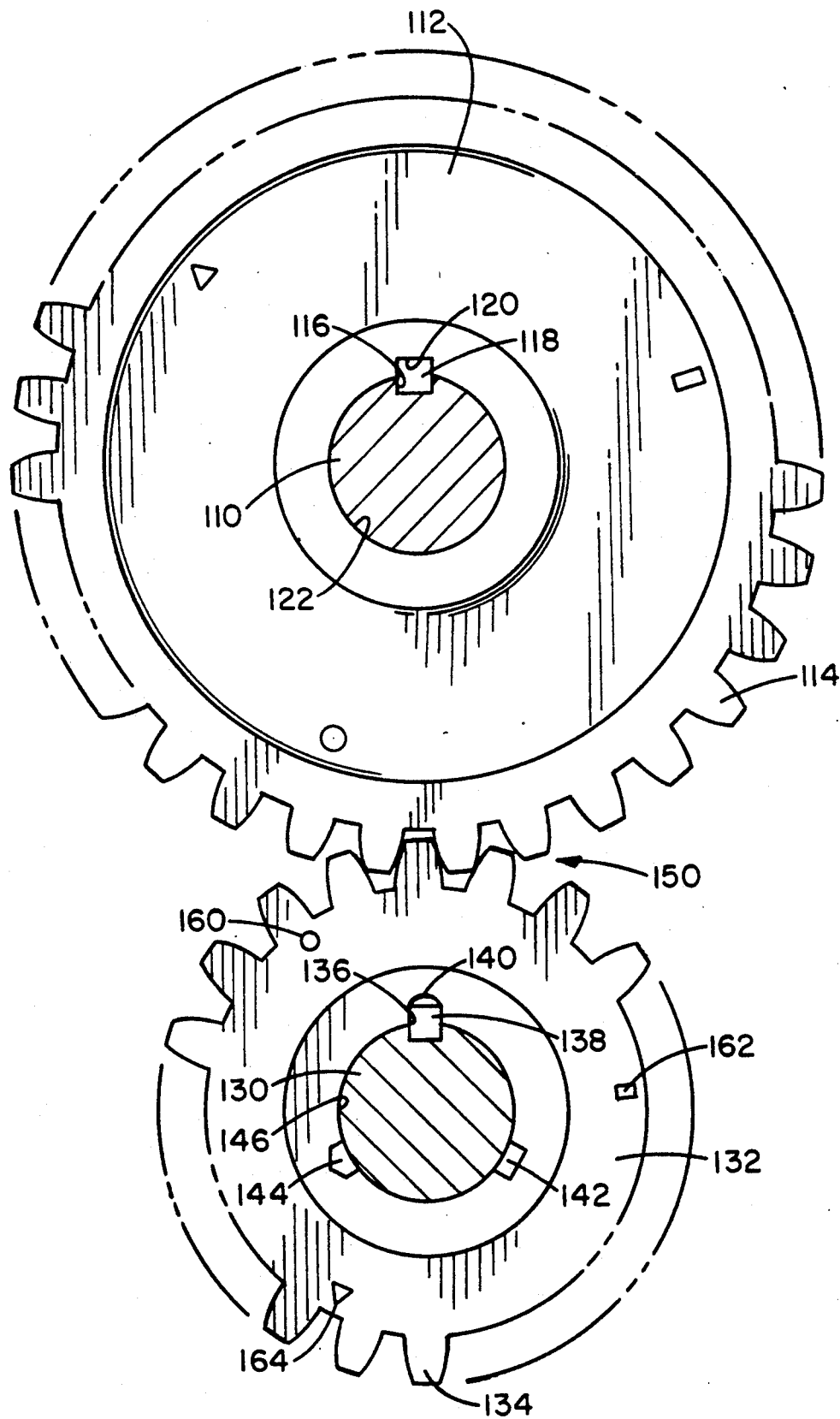

Referring now to the drawings wherein the showings are for purposes of illustrating preferred and alternate embodiments of the invention only and not for purposes of limiting same, FIG. 2 shows the subject new timing gear device A according to the present invention. While the timing gear is illustrated in FIG. 2 as being utilized in a sprocket gear environment, it should be appreciated that the timing gear device can also be utilized in a spur gear environment, as shown in FIG. 6, as well as in other environments.

With reference now to FIG. 2, the timing gear device includes a first shaft 10 and a first gear 12 having on an exterior periphery thereof a plurality of teeth 14. The shaft has located thereon a primary keyway 16 in which sits a key 18. The key extends also in a secondary keyway 20 communicating with a central shaft receiving opening 22 of the first gear 12.

Spaced from the first shaft 10 is a second shaft 30. Cooperating with the second shaft is a second gear 32 having a plurality of teeth 34 located on an outer periphery thereof. With reference now also to FIG. 3, located in the second shaft 30 is a primary keyway 36 in which is positioned a key 38. A plurality of secondary keyways 40, 42 and 44 are located in a spaced manner around a central shaft receiving opening 46 of the second gear 32. An engaging means 50 engages the first and second gears 12 and 32. If the gears 12 and 32 are sprocket gears, the engaging means can be in the form of a chain 52 as is illustrated. While a chain 52 is illustrated in FIG. 2, it should be appreciated that other flexible teeth engaging bands such as a toothed belt could be employed instead of the chain, as is well known to those skilled in the art.

Figure 1:
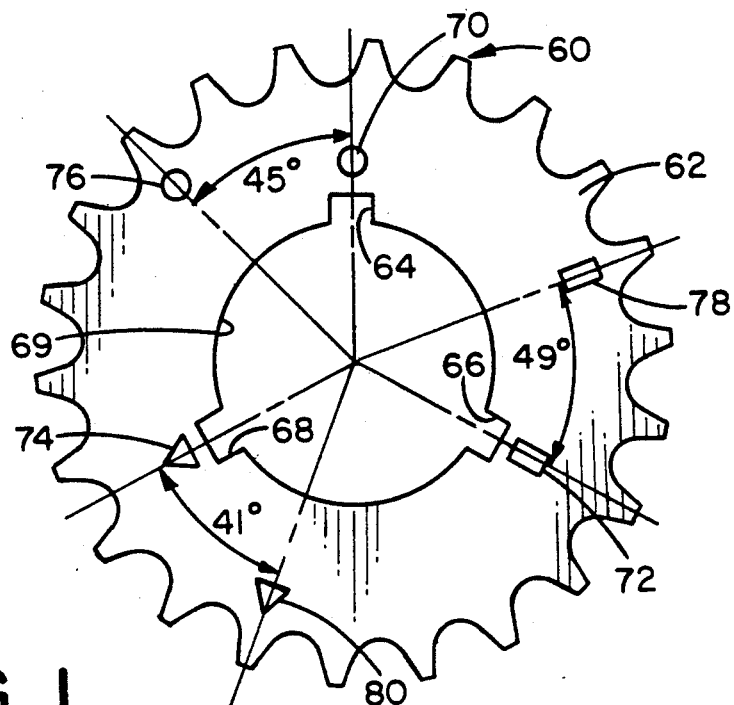
FIG. 1 is a side elevational view of a known sprocket gear.

The known sprocket gears of this nature, such as the gear 60 illustrated in FIG. 1 have a plurality of sprocket teeth 62 provided on an outer periphery of the gear and a plurality of secondary keyways 64, 66, and 68 that are spaced around a central shaft receiving opening 69 of the gear. For such gears, a set of first indicia 70, 72 and 74 are located immediately adjacent each keyway. The indicia 70, 72 and 74 differ in shape from each other such that the first indicia 70 could be a circle, the second indicia 72 could be a rectangle and the third indicia 74 could be a triangle as illustrated. Spaced from the first set of indicia is a second set of indicia 76, 78 and 80 which correspond to and are spaced from the first set of indicia and are located adjacent to a respective tooth of the sprocket gear. The first pair of circular indicia are separated by an angle of 45°, the second pair of rectangular indicia are separated by an angle of 49° and the third pair of triangular indicia are separated by an angle of 41° (from the centerline of the keyway to the centerline of the tooth in each instance). In this way, the timing of the shaft driven by the gear could be adjusted in relationship to the other gear of the system, such as in the system of FIG. 2.

One of the problems with this known prior art sprocket is that the face of the sprocket needs to be stamped twice to stamp on it all the indicia which adds an extra production step and increases manufacturing costs. In addition, the face of the sprocket becomes fairly cluttered and may lead to the confusion of the mechanic who is attempting to adjust the timing of the shaft to which the gear is connected.

Accordingly, the inventive gear 32 as shown in FIGS. 2 and 3 comprises a plurality of differently shaped secondary keyways 40, 42 and 44 spaced around the central shaft receiving opening 46. The first of these keyways 40 has a substantially circular closed end 90 as best shown in FIG. 4. The second of the keyways 42 has a substantially rectangular closed end 92 as is shown in FIG. 3. The third of these keyways 44 has a substantially wedge shaped or triangular closed end 94 as shown in FIG. 5. The circular closed end 90 is associated with a circular indicium 100 located immediately adjacent one of the teeth 34. Similarly, the rectangular closed end 92 is associated with a rectangular indicium 102 provided adjacent one of the teeth 34. Finally, a triangular indicium 104 is located adjacent one of the teeth 34 and is associated with the wedge shaped or triangular closed end 94 of the keyway 44.

Thus with the invention disclosed herein only one set of indicia, immediately adjacent a respective one of the teeth 34 of the sprocket gear 32 is necessary thereby eliminating the second set of stamped indicia disclosed in the prior art gear 60 of FIG. 1.

It is evident that as many keyways can be provided as are necessary and are capable of being cut into the gear as limited only by structural strength considerations for the gear. In the present invention, three such keyways are provided for the specific size of gear 32 illustrated. As mentioned, however, any other suitable desired number of keyways and teeth can also be provided. It is evident that if more keyways are provided, additional geometric shapes are needed for the closed ends of such keyways. Such shapes could be, e.g., a cross or a hexagon or the like.

If desired, the gear 32 can be made of a suitable conventional material such as 1144 steel. The tooth hardness for the gear 32 can be on the order of 45 to 55 on the Rockwell C hardness scale if desired. The gear 32 can have twenty-two (22) teeth with a pitch of 0.375 inches and a pitch diameter of 2.622 inches if desired. The shaft 30 to which the inventive gear 32 is secured can be either the crankshaft or the camshaft of a conventional internal combustion engine.

If desired, the gear 32 can have the middle keyway 42 serve as the standard or original equipment manufacturer (OEM) keyway. The other two keyways 40 and 44 serve, respectively, to advance are retard, by a set number of degrees, the timing of the engine to which the gear 32 is connected. In the preferred embodiment illustrated, this advance and retard of timing is by 4 degrees. It should be appreciated, however, that any other number of degrees of advance and retard of timing could also be accomplished by a suitable positioning of the keyways. For example, if one were to provide nine keyways in a gear, one could advance and retard the timing of the engine by 2, 4, 6 and 8 degrees.

The number of teeth provided on a gear of a given diameter can vary depending on the desired tooth height and the desired tooth spacing. For example, for a sprocket gear having a 2.8 inch diameter and a ⅜" sprocket tooth height, one could have on the order of 21 to 25 teeth as desired. In contrast, for the same gear with a ¼" sprocket tooth height, one could have 17 to 22 teeth as desired.

With respect now also to FIG. 6, while FIG. 2 illustrates an engaging means in the form of a chain 52 for connecting a pair of sprocket gears 12 and 32, the same inventive features can also be provided on spur gears. In this regard, a first shaft 110 is provided with a first gear 112 having on its outer periphery a plurality of teeth 114. A primary keyway 116 is located in the first shaft 110 and a key 118 is positioned in the keyway 116. A secondary keyway 120 communicating with a central shaft receiving opening 122 of the gear 112 cooperates with the key 118.

A second shaft 130 is spaced from the first shaft 110. A second gear 132 is associated with the second shaft. The second gear 132 has a plurality of teeth 134 on its outer periphery. Cut into the second shaft 130 is a second keyway 136 and positioned therein is a second key 138. Cooperating with the second key 138 is a secondary keyway 140 which, together with additional secondary keyways 142 and 144, is cut into the second gear 132 and is in communication with a central shaft receiving opening 146 of the gear. An engaging means 150 for this combination of spur gears is provided by the respective teeth of the gears themselves.

The secondary keyways 140, 142, and 144 have closed ends of different shapes, such as was also shown in FIG. 3. In this way, one can eliminate the necessity of stamping additional indicia into the gear 132 adjacent the shaft receiving opening 146 thereof.

The circular closed end 140 is associated with a circular indicium 160 located immediately adjacent one of the teeth 134. Similarly, the rectangular closed end 142 is associated with a rectangular indicium 162 provided adjacent one of the teeth 134. Finally, a triangular indicium 164 is located adjacent one of the teeth 134 and is associated with the wedge-shaped or triangular closed end 144.

Instead of employing the inventive design in sprocket gears, as illustrated in FIGS. 1-5 or in spur gears, as illustrated in FIG. 6, it would also be possible to employ this design in helical gears and double-helical or herringbone gears, as is known to those skilled in the art. Moreover, it is conceivable that the design could be employed with straight bevel gears and spiral bevel gears as well.

The invention has been described in connection with preferred and alternate embodiments. Obviously, alterations and modifications will occur to those skilled in the art upon a reading and understanding of this specification. It is intended to include all such modifications and alterations insofar as they come within the scope of the appended claims or the equivalents thereof.

What is claimed is:

1. A timing gear device comprising:
a first rotatably supported shaft;
a first gear, having a predetermined number of circumferentially spaced teeth, engaged on and carried by said first shaft;
a second rotatably supported shaft spaced from said first shaft;
a second gear, having a predetermined number of circumferentially spaced teeth engaged on and carried by said second shaft;
a means for engaging said first gear and said second gear; and,
a timing means for changing the rotative position of the second shaft and said second gear in relation to said first shaft and said first gear, said timing means comprising:
a single primary keyway in one of said second gear and said second shaft,
a plurality of secondary keyways in another of said second gear and said second shaft, wherein said secondary keyways have differing configurations, and
a key in said primary keyway, said key being engaged in a predetermined one of said secondary keyways.

2. The device of claim 1 wherein said secondary keyways are spaced apart a distance unequal to the circumferential extent of one of the teeth of said second gear.

3. The device of claim 1 wherein said secondary keyways are spaced apart a distance unequal to the circumferential extent of a multiple of the circumferential extent of one of the teeth of said second gear.

4. The device of claim 1 wherein said first and second gears comprise spur gears and said means for engaging comprises intermeshing teeth of said first and second gears.

5. The device of claim 1 wherein said first and second gears comprise sprocket gears and said means for engaging comprises a flexible teeth engaging band which is looped around said first and second gears.

6. The device of claim 1 wherein said key is engaged in a predetermined one of said secondary keyways to establish an accurate indexing of said first gear and said second gear.

7. The device of claim 6 wherein said key is engaged in a predetermined one of said secondary keyways to also establish a driving engagement between said first and second gears.

8. The device of claim 1 further comprising an indicium located on a side of said second gear, said indicium being associated with one of said secondary keyways.

9. The device of claim 1 wherein said differing configurations of said secondary keyways include a keyway having an arcuate closed end.

10. The device of claim wherein said differing configurations of said secondary keyways include a keyway having a wedge-shaped closed end.

11. A timing gear device comprising:
a first rotatably supported shaft;
a first gear, having a predetermined number of circumferentially spaced teeth, engaged on and carried by said first shaft;
a second rotatably supported shaft spaced from said first shaft;
a second gear, having a predetermined number of circumferentially spaced teeth, engaged on and carried by said second shaft;
a means for engaging said first gear and said second gear; and,
a timing means for changing the rotative position of the second shaft and said second gear in relation to said first shaft and said first gear, said timing means comprising:
a single primary keyway located in said second shaft,
a plurality of secondary keyways located in said second gear, wherein said secondary keyways have differing configurations including a keyway having an arcuate closed end and a keyway having a wedge-shaped closed end, and
a key in said primary keyway, said key being engaged in a predetermined one of said secondary keyways to establish an accurate indexing between said first gear and said second gear.

12. The device of claim 11 wherein said secondary keyways are spaced apart a distance unequal to the circumferential extent of one of the teeth of said second gear.

13. The device of claim 11 wherein said secondary keyways are spaced apart a distance unequal to the circumferential extent of a multiple of the circumferential extent of one of the teeth of said second gear.

14. The device of claim 11 wherein said first and second gears comprise spur gears and said means for engaging comprises intermeshing teeth of said first and second gears.

15. The device of claim 11 wherein said first and second gears comprise sprocket gears and said means for engaging comprises a flexible teeth engaging band which is looped around said first and second gears.

16. The device of claim 11 further comprising an indicium located on a side of said second gear, said indicium being associated with one of said secondary keyways.

17. A timing gear device comprising:
a first rotatably supported shaft;
a first gear, having a predetermined number of circumferentially spaced teeth, engaged on and carried by said first shaft;
a second rotatably supported shaft spaced from said first shaft;
a second gear engaged on and carried by said second shaft, said second gear having a central shaft receiving opening and having a predetermined number of circumferentially spaced teeth;
a means for engaging said first gear and said second gear; and,
a timing means for changing the rotative position of the second shaft and said second gear in relation to said first shaft and said first gear, said timing means comprising:
a single primary keyway located in said second shaft,
a plurality of secondary keyways located in said second gear and opening radially inwardly into said central shaft receiving opening, wherein said secondary keyways have differing configurations including a keyway having an arcuate closed end and a keyway having a wedge-shaped closed end, and
a key in said primary keyway, said key being engaged in a predetermined one of said secondary keyways to establish an indexing and driving engagement between said second shaft and said second gear.

18. The device of claim 17 wherein said second keyways are spaced apart a distance equal to a relative circumferential movement between said first shaft and said second shaft, effected by moving the key from one secondary keyway to an adjacent secondary keyway or a multiple thereof plus a distance equal to a predetermined fraction of said relative circumferential movement.

19. The device of claim 17 further comprising an indicium located on a side of said second gear, said indicium being associated with one of said secondary keyways and being located adjacent one of the teeth of said second gear.

20. The device of claim 19 wherein a plurality of indicia are located on said second gear each indicium being associated with a respective one of said secondary keyways and being located adjacent respective ones of the teeth of said second gear.

* * * * *